(12) United States Patent
Bourbon et al.

(10) Patent No.: US 12,335,381 B2
(45) Date of Patent: Jun. 17, 2025

(54) METHOD FOR MANAGING FILESYSTEM ELEMENTS, METHOD FOR SETTING UP USER ACCESS TO A STORAGE SYSTEM, SYSTEM AND NON-TRANSITORY COMPUTER READABLE STORAGE MEDIUM

(71) Applicant: SAMSUNG ELETRÔNICA DA AMAZÔNIA LTDA., São Paulo (BR)

(72) Inventors: Bruno C. Bourbon, Recife (BR);
Cristovao Z. Rufino, Recife (BR);
Emerson L. Espinola, Recife (BR);
Hebert J. A. Duarte, Recife (BR);
Pether J. Silva, Recife (BR); Jose Roberto Ribeiro Junior, Campinas (BR); Anderson Nunes Paiva Morais, Campinas (BR)

(73) Assignee: SAMSUNG ELETRÔNICA DA AMAZÔNIA LTDA., Campinas (BR)

( * ) Notice: Subject to any disclaimer, the term of this patent is extended or adjusted under 35 U.S.C. 154(b) by 351 days.

(21) Appl. No.: 17/958,547

(22) Filed: Oct. 3, 2022

(65) Prior Publication Data

US 2023/0403145 A1 Dec. 14, 2023

(30) Foreign Application Priority Data

Jun. 13, 2022 (BR) ...................... 10 2022 011624-5

(51) Int. Cl.
*H04L 9/08* (2006.01)
*G06F 16/13* (2019.01)
(Continued)

(52) U.S. Cl.
CPC .......... *H04L 9/0866* (2013.01); *G06F 16/137* (2019.01); *G06F 16/162* (2019.01);
(Continued)

(58) Field of Classification Search
CPC ... H04L 9/0866; H04L 9/0643; H04L 9/3231; H04L 9/0891; H04L 9/0894; H04L 67/06;
(Continued)

(56) References Cited

U.S. PATENT DOCUMENTS 9,647,836 B2  5/2017 Paris et al.
10,043,029 B2  8/2018 Murray
(Continued)

FOREIGN PATENT DOCUMENTS

CN  104992124 A  10/2015
CN  105678189 A  6/2016
(Continued)

*Primary Examiner* — Richard G Keehn

(57) ABSTRACT

A method of managing filesystem elements between a user device and a network connected to the user device comprising: receiving a request related to a filesystem element operation over the network; performing the filesystem element operation; updating a local metadata file based on the operation; downloading an encrypted network metadata file including data of the filesystem on the network from the network to the user device. The method comprises decrypting the encrypted network metadata file on the user device with a network encryption key; and provided the network metadata stored in the network is newer than the updated local metadata file, merging the network metadata file stored in the network with the updated local metadata file to update the local metadata file. The method comprises encrypting the updated local metadata file on the user device with the network encryption key; and uploading the encrypted updated metadata file to the network.

19 Claims, 4 Drawing Sheets

(51) Int. Cl.
    *G06F 16/16*     (2019.01)
    *G06F 16/182*     (2019.01)
    *H04L 9/06*     (2006.01)
    *H04L 9/32*     (2006.01)

(52) U.S. Cl.
    CPC .......... *G06F 16/164* (2019.01); *G06F 16/183* (2019.01); *H04L 9/0643* (2013.01); *H04L 9/3231* (2013.01)

(58) Field of Classification Search
    CPC . H04L 67/10; H04L 67/1097; H04L 63/0428; H04L 63/101; G06F 16/137; G06F 16/162; G06F 16/164; G06F 16/183; G06F 21/6218; G06F 21/6209; G06F 2221/2141; H04W 12/03
    See application file for complete search history.

(56) References Cited

U.S. PATENT DOCUMENTS

| | | | | |
|---|---|---|---|---|
| 2010/0257351 | A1* | 10/2010 | O'Connor | G06F 21/606 |
| | | | | 713/150 |
| 2013/0339407 | A1* | 12/2013 | Sharpe | G06F 16/137 |
| | | | | 707/827 |
| 2016/0267279 | A1* | 9/2016 | Catalano | H04L 9/0861 |
| 2018/0091482 | A1* | 3/2018 | Steele | G06F 21/60 |
| 2018/0137291 | A1* | 5/2018 | Ho | G06F 21/602 |
| 2020/0250092 | A1* | 8/2020 | Szeredi | G06F 12/0897 |
| 2022/0391534 | A1* | 12/2022 | Randhava | G06F 21/6245 |

FOREIGN PATENT DOCUMENTS

| | | | | |
|---|---|---|---|---|
| CN | 106936771 A | | 7/2017 | |
| CN | 110995690 A | | 4/2020 | |
| CN | 111368347 A | | 7/2020 | |
| CN | 112817998 A | * | 5/2021 | .......... G06F 11/1464 |

* cited by examiner

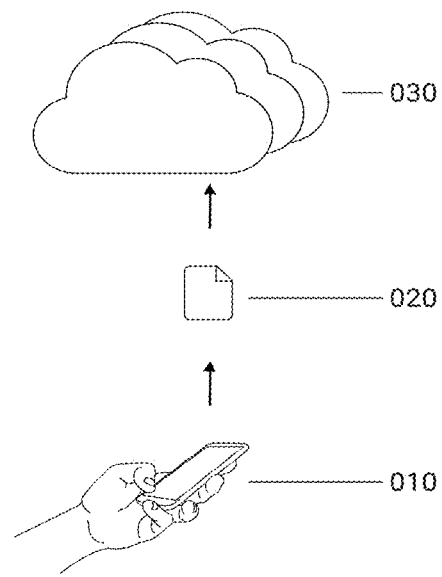
Fig. 1
Fig. 2
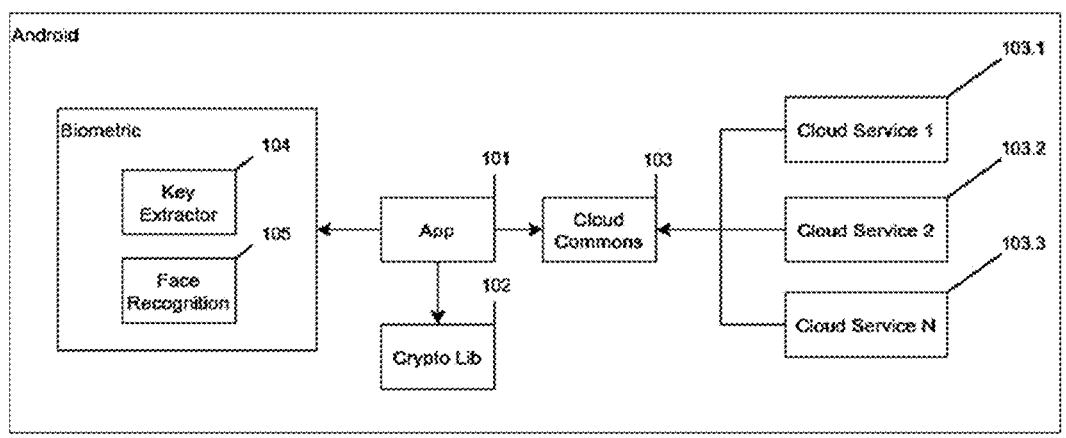

METHOD FOR MANAGING FILESYSTEM ELEMENTS, METHOD FOR SETTING UP USER ACCESS TO A STORAGE SYSTEM, SYSTEM AND NON-TRANSITORY COMPUTER READABLE STORAGE MEDIUM

CROSS-REFERENCE TO RELATED APPLICATION(S)

This application is based on and claims priority under 35 U.S.C. § 119 to Brazilian Patent Application No. BR 10 2022 011624-5, filed on Jun. 13, 2022, in the Brazilian Intellectual Property Office, the disclosure of which is incorporated by reference herein in its entirety.

FIELD OF THE DISCLOSURE

The present invention refers to a method and a system for improving file management and security in cloud services by reducing device storage usage and network resource consumption. In addition, the present invention refers to a method for setting up user access to a storage system.

DESCRIPTION OF RELATED ART

The raise of cloud providers made the life of people, teams, and organizations more convenient to store, monitor, and manage data. However, with the rapid growth of cloud service popularity, the amount of data and computing resources being used by the cloud infrastructure, e.g., hardware, software, and network, have increased enormously, and storage is the most demanding cloud computing resource nowadays. Data security is one of the key concerns in any cloud storage service. To ensure that the data is secure, it became necessary to implement a set of policies, technologies, software, and applications to protect personal and corporative data. In addition, cloud service providers cannot be fully trusted since they are prone to external and internal security threats, such as compromised software and APIs (Application Programming Interfaces), malicious employees, and hackers.

Users usually upload files to a cloud service, however, the users may not trust the cloud service. Most of the solutions in the market consider encrypting the content of the file so the cloud service will not be able to read the file content without the user's permission. For instance, in case the cloud service provider is compromised, the data needs to be secured, i.e., the user has to encrypt the data before it is sent to the cloud server, and keep it encrypted for the period of time that the data is stored in the cloud.

Dealing with files in cloud is costly regarding resource consumption for storing and transmitting the data over the network. The scenario becomes more challenging when the files are encrypted. Systems have to download the entire encrypted file, decrypt it, process the file, re-encrypt it, and upload the re-encrypted file back to the server if they want to perform any operation such as rename or move this file, which it is not efficient. Not to mention that cloud services have quotas that limit the number of cloud requests to them, and the users are not sure that non-authorized people will not try to read the content of the files. Some cloud services offer encryption by default, but the user's files do still risk having part of their content discovered through cryptanalysis techniques using the name of the file.

The state of the art comprises some techniques that try to solve the issue of keeping a file safe in the cloud. However, most of them use multiple files of metadata, as mentioned above.

Document CN105678189A describes a method for retrieving encrypted data files from a cloud storage service. However, this method creates one metadata file for each file uploaded to the cloud storage system, and insert keywords in this file, among other information of it, that the user or another system can query it. However, this approach, beyond the fact that it needs a query before accessing one or all files, keeps the name of the file in plain text, then creating a breach for an attacker to use cryptanalysis methods for discovering parts of the file.

Document CN104992124A describes a method for ensuring document safety access and performs cloud retrieval process through document metadata information. However, this method creates one metadata file for each file uploaded to the cloud, and the user inputs the basic metadata information of the document after the cloud client selects the uploaded document. Further, the table of document metadata information is updated with the metadata sent from the client. However, this solution, beyond the fact that it uses a query before accessing one or all files, and in this case the query is made using an encrypted keyword, keeps the name of the file in plain text which can be used by an attacker to discover parts of the file applying cryptanalysis methods.

Patent U.S. Pat. No. 10,043,029B2 describes a method for securing a plain text file as an encrypted file, i.e., a ciphertext, in a cloud storage. However, the mentioned patent creates one metadata file for each file uploaded to the cloud service, stores the key to decrypt the file in the metadata, and protect the metadata from modification by computing a hash message authentication code (HMAC). However, their method, beyond the fact that it performs a query before accessing one or all files, keeps the name of the file in plain text, so creating a security breach that an attacker could exploit to discover parts of the file by using cryptanalysis techniques.

Patent U.S. Pat. No. 9,647,836B2 describes a method for providing a secure bundle that is employed to manage data storage of shared documents using a network computer. However, the mentioned patent is more concerned about encrypting the file to be stored, than retrieving it, therefore consuming more data traffic. The file may be encrypted entirely or in portions using a set of public keys. A header with some node instructions is appended to the file and is also encrypted. Moreover, their approach keeps the name of the file in plain text, and it creates a security breach for an attacker to use cryptanalysis methods to discover parts of the file content. In addition, their method needs to execute a query before accessing one or all files.

Document CN110995690A describes a secure data storage method based on cloud storage. However, the mentioned patent creates one metadata file for each file uploaded to the cloud. However, their approach, in addition to the fact that the metadata is not used for queries like other patents mentioned above, keeps the name of the file in plain text, then creating a chance for an attacker to use cryptanalysis methods for discovering parts of the file. Moreover, the keys used to encrypt and decrypt a file are uploaded separately from the file and the metadata.

Document CN111368347A describes a method of an airborne industrial Internet cloud platform. However, this patent adopts P2P symmetrical secure storage architecture, and the metadata serves only to locate the encrypted file in P2P storage node. Yet, this approach is vague when stating about encrypting the files, in addition it keeps the name of the file in plain text which creates a breach for an attacker to use cryptanalysis methods for discovering parts of the file.

Document CN106936771A describes a method and system based on hierarchical encryption. However, the mentioned patent selects different encryption algorithms to encrypt metadata files depending on the situation. Additionally, this invention keeps the name of the file in plain text, creating a security breach for a hacker to use cryptanalysis methods to discover parts of the file.

As seen above, the state of the art comprises several solutions for safely storing files in a cloud service. However, there is a need for a solution capable of reducing storage usage while managing user files in a cloud service and minimizing the traffic of data between the device and the cloud service. In addition, there is a need of a solution that enables the control of the encryption while storing files in cloud services.

Presume the systems could mitigate this risk, have the control of encryption in hand, and besides are able to perform less transactions, i.e., less data downloaded and uploaded, then improving the user experience by making the file transfer service more responsive to users and making sure the files are secured. In order to address these issues, it is proposed by the present invention the use of Single File Multiple Metadata (SFMM) technique. By applying SFMM technique, all operations intended to be performed over a file in the cloud service can be performed by manipulating only one small file, which carries the metadata of the target file (and from all others in that filesystem). After applying the intended changes, only this single small metadata file needs to be uploaded to the cloud.

For instance, let us assume a scenario wherein the user has ten photos in the cloud service and each photo is around 2 MB. Considering the user wants to make sure that these files are secure, the photos are encrypted, and their names are replaced with the hash generated by, for example, SHA-256 hash function, from the same encrypted file in order to avoid a malicious person to guess part of the file content using cryptanalysis techniques. Considering traditional methods, if the user wants to rename one single file, the system needs to list all files (one cloud request), these files need to be downloaded (ten cloud requests and 20 MB of data transfer), since all filenames are hidden (by the hash function), and decrypted. Following, the target file is renamed, encrypted again, and upload back to the cloud service (one cloud request and 2 MB of data transfer).

Differently, using SFMM technique in this same scenario, the system needs to download only one metadata file (one cloud request and ~2 KB of data transfer), decrypt it, find the target name inside it, rename the target name, encrypt the updated metadata file, and upload it back to the cloud (one cloud request and ~2 KB of data transfer). It is much faster than the traditional approach that needs twelve operation requests against only two operation requests of SFMM approach.

SUMMARY OF THE INVENTION

In order to achieve the objectives above, according to an embodiment, the present invention discloses a method for managing filesystem elements between a user device and a network, wherein the user device comprises a local metadata file and a network encryption key, and the network comprises an encrypted network metadata file. The method includes receiving a request related to a filesystem element operation over the network; performing the filesystem element operation; updating the local metadata file based on the operation; and downloading the encrypted network metadata file from the network to the user device, wherein the encrypted network metadata file comprises data of the filesystem on the network.

The method includes decrypting the encrypted network metadata file on the user device with the network encryption key; provided network metadata stored in the network is newer than the updated local metadata file, merging the network metadata file stored in the network with the updated local metadata file to update the local metadata file with data from the network metadata file; encrypting the updated local metadata file on the user device with the network encryption key; and uploading the encrypted updated metadata file to the network.

In addition, according to an embodiment, the present invention also refers to a method for setting up user access to a storage system comprising: requesting, via an application on a user device, account credentials of an user; checking whether the user has an account associated with a cloud service; provided the user does not have an account, creating a new account for the user; otherwise, downloading the previously stored encrypted base key and a helper vector from a secure database on the interne; scanning the user face with a camera of the user device; provided a help vector is available, reproducing a biometric user key with the helper vector and decrypting the base key; otherwise, the method includes generating a biometric key; creating a base key; encrypting the base key; upload the encrypted base key and helper vector to the cloud service; creating a device key associated with the user device; signing in the cloud service; creating a service key; encrypting the service key; and uploading the encrypted service key to the cloud service.

The present invention is also related to a system and non-transitory computer readable storage medium having instructions stored therein to perform a method for managing filesystem elements on a cloud service.

BRIEF DESCRIPTION OF THE DRAWINGS

The invention is explained in greater detail below and makes references to the drawings and figures, attached herewith, when necessary. Attached herewith are:

FIG. 1 shows an illustrative example of a system for storing files on a cloud service according to an embodiment of the present invention.

FIG. 2 shows a block diagram of the architecture of a system according to an embodiment of the present invention.

DETAILED DESCRIPTION OF THE INVENTION

Figure 3:
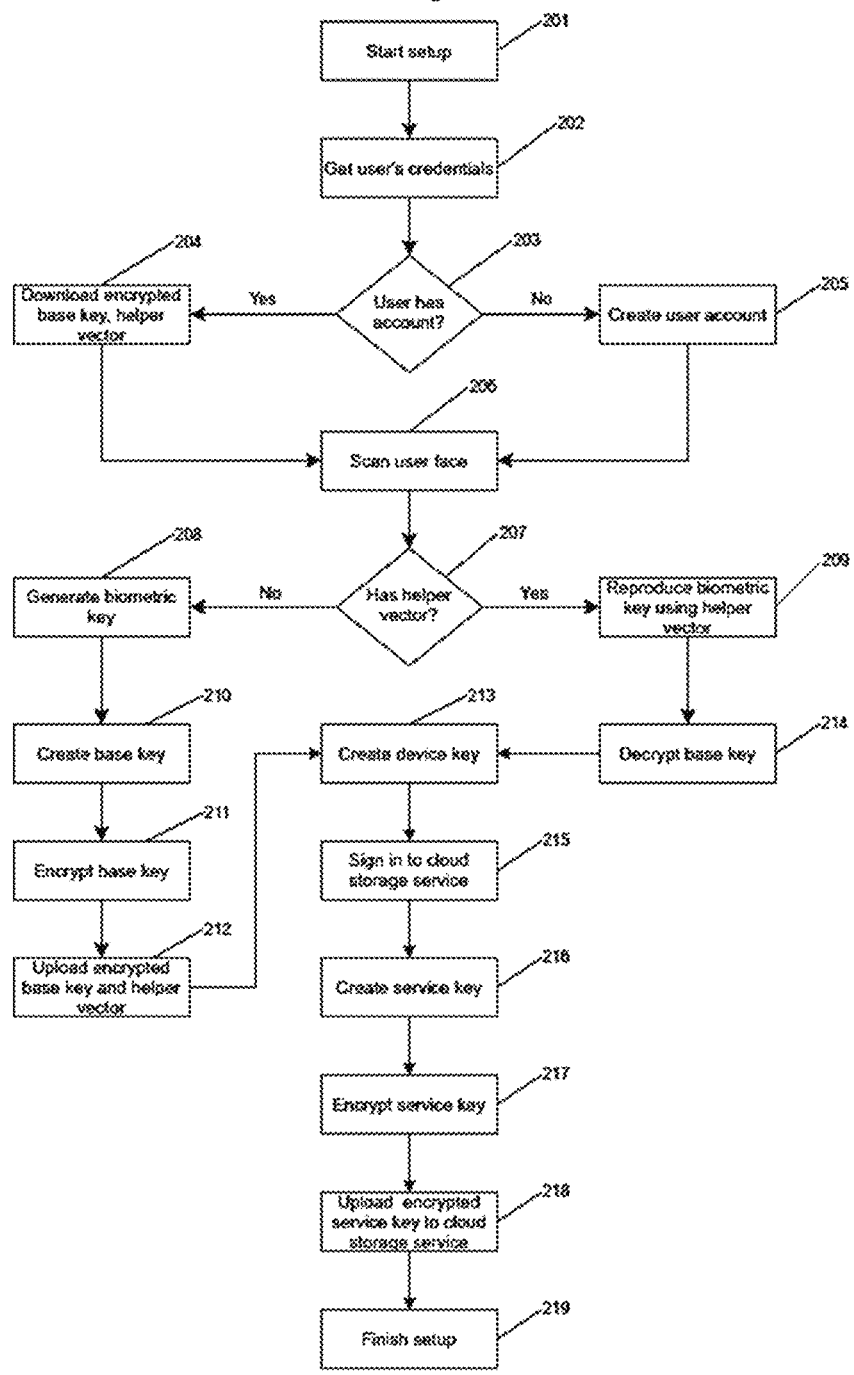
FIG. 3 shows a flow diagram of a method for setting up user access to a storage system according to an embodiment of the present invention.

According to an embodiment, present invention is directed to a method for managing filesystem elements between a user device and a network, wherein the user device comprises a local metadata file and a network encryption key, and the network comprises an encrypted network metadata file.

The method includes receiving, from the user device connected to the network, a request related to a filesystem element operation over the network; performing the filesystem element operation; updating the local metadata file based on the operation; downloading an encrypted network metadata file from the network to the user device, wherein the encrypted network metadata file comprises data of the filesystem on the network; decrypting the encrypted network metadata file on the user device with the network encryption key;

The method includes, provided network metadata stored in the network is newer than the updated local metadata file, merging the network metadata file stored in the network with the updated local metadata file to update the local metadata file with data from the network metadata file; encrypting the updated local metadata file on the user device with the network encryption key; and uploading the encrypted updated metadata file to the network.

However, the present invention may be embodied in many different forms and should not be construed as limited to the embodiments set forth herein; rather, these embodiments are provided so that this disclosure will be thorough and complete, and will fully convey the scope of the invention to those skilled in the art. Still, alternative embodiments of the structures and methods disclosed herein will be readily recognized as viable alternatives that may be employed without departing from the principles of the claimed invention.

As used herein the term "cloud service" refers to cloud based networked computing environments that usually enable location transparent access to services and/or applications. Cloud services may be comprised of one or more physical network computers. These physical network computers may be coupled using one or more networks and/or arranged into clusters. In some cases, users may access cloud networks over public networks, such as, the internet. Cloud services may comprise numerous physical computers and storage devices arranged such that the number and arrangement of the physical computers and devices are hidden from the users of a cloud network. Cloud network infrastructure, the details and architecture of which may vary depending on the cloud network provider, automatically provision and deploy applications and services onto the physical hardware transparent to the users of cloud services.

As used herein the terms, "encryption," and "decryption," refer to cryptographic operations that may be performed on data. Generally, encryption may refer to one or more cryptographic operations that may be performed on data to secure it for transmission and/or storage. In some cases, data may be encoded using public key/private key cryptography. In other cases, cryptographic operations may employ symmetric keys. Further, in some embodiments, data operations such as compression/decompression may be employed before and/or simultaneously while data is encrypted or decrypted. Accordingly, herein it is assumed that encryption, decryption, and cryptographic operations may include one or more additional steps such as compression, decompression, data padding, data seeding, or the like, or combination thereof. Furthermore, the term "encryption key" as used herein is a cryptographic key used for symmetric encryption that is generated by a security application and/or secure storage application based on instruction set information. The encryption key is used in cryptographic operations to encrypt and/or decrypt data for secure storage.

Given the limited space in the device, the first thing that comes up to the user is to push some files to a cloud service. However, the user may have limited bandwidth and may not trust the cloud service. Most of the solutions in the market consider encrypting the content of the file so the cloud service will not be able to read the file content without the user's permission.

However, upon encrypting only the contents of the file and the name of the file is kept unchanged, we offer to an attacker the possibility of applying cryptanalysis techniques (that is the art or process of deciphering coded messages without being told the key), and as a result the chance to discover parts of the content of that file because its name can provide hints or suggestions about its content. Part of the solution proposed by the present invention is to replace the name of the file that is being uploaded to the cloud service with the hash generated from the same encrypted file. Therefore, with the file name secured, we only have to save the original file name somewhere for the time when the user wants to access that file. As it will be seen, the present invention proposes the use of a single metadata file to store all file's metadata of the network filesystem.

Among other advantages, the inventive features of the proposed solution provides two principal technical effects. Firstly, the proposed invention secures the file name with the hash of the encrypted file that is generated using a strong cryptographic hash function as most of cloud storage solutions keep the file name in plain text then allowing an attacker to apply cryptanalysis techniques to discover part of file content. Secondly, the present invention uses a small footprint file that contains the description of all user files in the device filesystem in the form of metadata, and it is employed for performing file operations, e.g., rename, delete, or move, in the cloud service in order to reduce the amount of data traffic exchanged between the device and the cloud service.

The metadata file comprises data representing the filesystem in the cloud service and is created by the device that is sending files to the cloud. Preferably, it is a JSON file with the following fields:

d: A Boolean that marks whether the filesystem element is a file or a directory.
  h: A String with the filesystem element hash. This hash is unique inside filesystem and in case that the element is a file, it is the hash of the encrypted file. If the element is a folder, then a random hash is generated since folders are special files that can be moved, renamed, and deleted. The folder hash makes folders unique files that can be easily located even after a rename operation. Root directory's hash is always "00000000-0000-0000-0000-000000000000".
  n: A String with the element name.
  t: A Long value with the "time since epoch" when the file was added to the filesystem.
  c: A List of JSON filesystem's elements. This field is only set if the element's type is directory.
  m: A String containing the key used to encrypt the file's content.
  s: A Boolean that marks whether this file was shared or not.
  u: A String with the URL used to access the file content. This field should be used only if the file was shared with the current user.
  o: A String that stores the file's owner. This field should be used only if the file was shared with the current user.

For instance, consider the user device has the file tree below:

```
root
|→ dir1
    |→ dir1-1
    |→ fileB.jpg
|→ dir2
|→ fileA.png
```

Here is an example of the filesystem file that represents the file tree above:

```
{
"d":true,
"h":"00000000-0000-0000-0000-000000000000",
"n":"",
"t":1575987233683,
"c":[
  {
    "d":true,
    "h":"bd9248ee-8e36-46e1-b304-3244d47076d2",
    "n":"dir1",
    "t":1575987260360,
    "c":[
      {
        "d":true,
        "h": "b8e52697-e75b-4a02-9664-79af834eb522",
        "n":"dir1-1",
        "t":1575987520262,
        "c":[ ]
      },
      {
        "d":false,
        "h":"a6b0619628cb21aa36c40d1f78136790c4244eb97411a1aea8c4e8fb1a91f47d",
        "n":"fileB.png",
        "t":1575987583145,
        "s":false,
        "m":"ezDhVlnYeEsRLQ19wV3TWw=="
      }
    ]
  },
  {
    "d":true,
    "h":"4891b340-4ce7-4b81-aebc-869e5aba3fea",
    "n":"dir2",
    "t":1575987507404,
    "c":[ ]
  },
  {
    "d":false,
    "h":"2cf0c2a94a10c4027b3e0f84bbb274793679aad18e977bf9e828d1b08b889c82",
    "n":"fileA.jpg",
    "t":1575987568375,
    "s":false,
    "m":"wDykxwCaEBMhb3XJ3QAaHw=="
  }
]
}
```

Preferably, this network metadata file is also stored in the cloud service in case the user may also want to access the entire file tree in another device on the network. For example, on a cloud storage, the user can use a different device for accessing the storage but with the same cloud account. Differently from other solutions, this metadata file, as the content of user files, is also encrypted.

Most of the solutions on the prior art create multiple metadata files and do not encrypt those files. These metadata files and the name of user files inside them are in plain text. Having only one single file means the device will carry out less requests to the cloud service. Consequently, less requests to the cloud means less data exchanged between the device and the cloud, and it can be accommodated in the limited bandwidth of the device.

The general step-by-step of the proposed method will be described below.

A set of keys must be created in the user device before the whole solution is performed. First, it is needed a user key, i.e., a passphrase or a biometric key that represents a key from the user. Second, the device creates a random key that will be used to encrypt the next key and it is called as base key. The third key is also a random key that represents the network key for the cloud service, and it is called the service key. The device can be connected to a certain number of cloud services. The device must create a network key, i.e., a service key, for each cloud service. Another key is called the device key, which is created using a Key Derivation Function (KDF) from the base key and the device unique identifier (UID). More details about the usage of this key will be explained after. The reason for using a KDF cryptographic hash function is to increase the strength of the key that will encrypt the local metadata file stored locally, then reducing the chances of successful brutal force and dictionary attacks.

The base key, the network key (or service key), and the device key are stored in the user device itself. For instance, in Android devices, it is strongly recommended to make usage of the KeyStore API. The network key is encrypted with the base key and it is also uploaded to the network, or preferentially, the cloud service in order to make it easy for other devices to synchronize with this one.

The local filesystem metadata file is created, encrypted with the network key, and uploaded to the network. A copy of the network metadata file is encrypted with the device key, and it is cached in the device so it can be utilized later.

For each file that the device uploads to the cloud service, a new random key is generated in order to encrypt that file. After the file is encrypted, a hash value is generated from it and then the name of this file is replaced with this hash. The original file name, hash value, and key are added to the network metadata file along with other parameters related to this file, such as file path, time, and others explained above.

If the network metadata file stored in the cloud is newer than the local metadata file created, a merge of these files is made in order to guarantee that the system will use the most up-to-date file.

The updated local metadata file is then encrypted with the service key.

Both encrypted file and metadata file are uploaded to the cloud service.

The six operations that can be performed over the cloud storage are: i) upload file, ii) download file, iii) delete file or folder, iv) move file or folder, v) rename file or folder, and vi) create folder. When the device needs to upload or download a file, it is expected that the whole file travel through the network. However, when the other four operations need to be performed, only changes in the metadata file are required and only the metadata file needs to be uploaded to the cloud service.

Having generally described the features of the proposed invention, the characteristics of a system and method for managing files on cloud services will be described in order to clarify the context thereof.

FIG. 1 shows an illustrative system that represents the interaction of the different components during operation of a cloud service. The system comprises a user device represented by the smartphone 010 which, in the exemplificative embodiments, comprises an Android operating system. As it will be clear, different platforms or operating systems can be used in the principle of the present invention such as iOS, Tizen, Windows Phone. In addition, different user devices may be used in the context of the present invention, such as desktop computers, notebooks, tablets, Smart TVs, smartwatches, and other electronic devices capable of conducting operations over cloud services. However, for simplicity's sake, the following description will be based on the use of a smartphone with an Android operating system and comprising means for receiving user input and collecting user biometrics data such as face biometrics or fingerprints. Moreover, using the user device 010, the user chooses the files 020 that will be stored in the cloud service 030.

In addition, the present invention also refers to a method for setting up user access to a storage system comprising: requesting, via an application on a user device, account credentials of an user; checking whether the user has an account associated with a cloud service; if the user does not have an account, creating a new account for the user; otherwise, downloading the previously stored encrypted base key and a helper vector (204) from a secure database on the internet; scanning the user face with a camera of the user device.

When a help vector is available, reproducing a biometric user key with the helper vector and decrypting the base key; otherwise, generating a biometric key; creating a base key; encrypting the base key; upload the encrypted base key and helper vector to the cloud service;

The method includes creating a device key associated with the user device; signing in the cloud service; creating a service key; encrypting the service key; and uploading the encrypted service key to the cloud service.

The following explanation will particularly describe the steps of the method above.

FIG. 2 shows a general architecture of a system for securely managing and storing files on cloud services according to an embodiment of the present invention. It should be noted that the architecture of the system is merely exemplificative and, thus, some variations can be made within the scope of the present invention.

The system comprises an application 101 which is implemented on a user device, that is, a device that is connected to the cloud service, so the user can select at least one file 020 that will be managed, uploaded, and downloaded on the cloud. The Cryptographic Lib 102 is in charge of encrypting and decrypting the files 020 as well executing the hashing functions for generating the hash values.

Following the description of FIG. 2, the system comprises a Cloud Commons component 103 for providing the common interface for different cloud services. Therefore, through the user device the user is able to choose which cloud service will be accessed for storing, uploading or managing the files. Therefore, the user can select one cloud service between a plurality of cloud services 103.1-103.3. In addition, the app 101 comprises a biometric component which has two preferable components: i) the Face Recognition component 105 that reads biometric data from the user's face and sends it to a Key Extractor component 104 in order to generate the biometric key and the helper vector, which will be covered in more details below.

In FIG. 3, we can observe the setup steps that certify that the proposed method works as designed. As it will be seen, the steps of FIG. 3 refer to the steps that will be conducted by a user upon accessing a cloud storage system. In addition, the steps consider a preferential embodiment encompassing the setup of optional security features that may vary according to the network provider and, naturally, this illustrative embodiment is not limitative.

Preferably, after the start of the setup process 201, the application asks the user's account credentials 202. Then, the application checks whether the user has an account 203 enrolled in the storage system.

If the user does not have an account, the application creates a new account 205 for the user. Otherwise, the application downloads the previously stored encrypted base key and helper vector 204 from a secure database on the internet. The helper vector is an integer array used to reproduce the biometric key from user's facial features.

Then, the application uses the device's camera to scan the user face 206 and computes an integer vector containing face features. In alternative embodiments, other biometrics, such as fingerprints, may be collected provided that the user device is configured for collecting such data.

If a helper vector 207 is available (that was downloaded from the user account), the application inputs the helper vector and the feature vector to the key extractor and reproduces the biometric key 209. The biometric key is then used to decrypt the base key 214.

Otherwise, the face features are input in the key extractor to generate a biometric key and a helper vector 208. Then, the base key is created 210 and encrypted using the biometric key 211. The encrypted base key and the helper vector are then uploaded to the secure internet database 212.

After decrypting the base key 214 or uploading the encrypted base key and helper vector 212, the system creates the device key 213. The application asks for the user's cloud storage service credentials in order to sign in the service 215. Finally, the application creates the service key 216, which is encrypted with base key 217, uploaded to the cloud service 218, and the setup process is finished 219.

Figure 4:
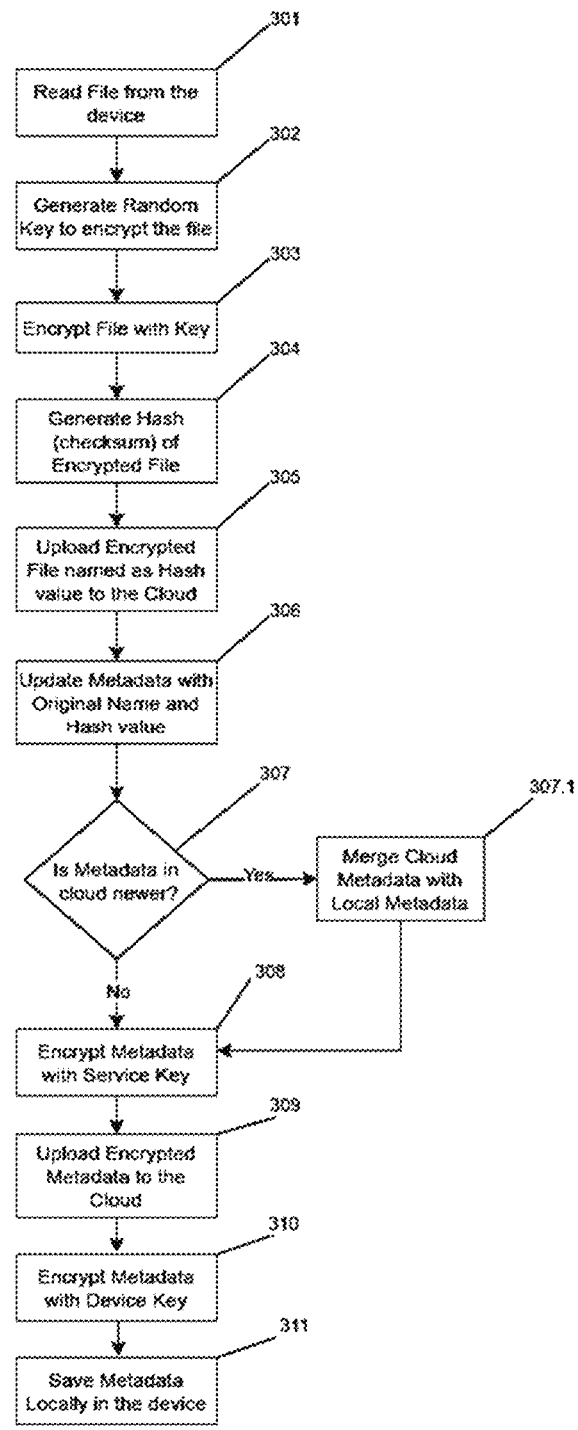
FIG. 4 shows a flow diagram of a method for sending a file to a cloud service according to an embodiment of the present invention.

Given that the device is configured as defined by the user, FIG. 4 shows the steps of an operation for sending a file to the cloud service.

After the user selects a file from the device to be uploaded, this file is read entirely 301 by the system, and then a new random key is generated 302 in order to encrypt 303 this file. Before the system uploads 305 the file to the cloud, its name is replaced with a hash value using a hashing function 304. Preferably, the file name is replaced with a hash code, i.e., a checksum, generated from the encrypted file using, for example, SHA-256 hash function. However, several encryption and hashing functions or algorithms may be used according to the present invention.

Then, the file, having the computed hash as its new name, is uploaded to the cloud service 305. The original file name and hash value are saved in the metadata file 306 and this metadata file is compared with the metadata file stored in the cloud service 307.

If the metadata file from the cloud is newer, the system merges both files 307.1, before encrypting it with the service key 308. Finally, the metadata file is uploaded to the cloud 309, then the metadata file is encrypted with the device key 310 and saved locally in the device 311.

Figure 5:
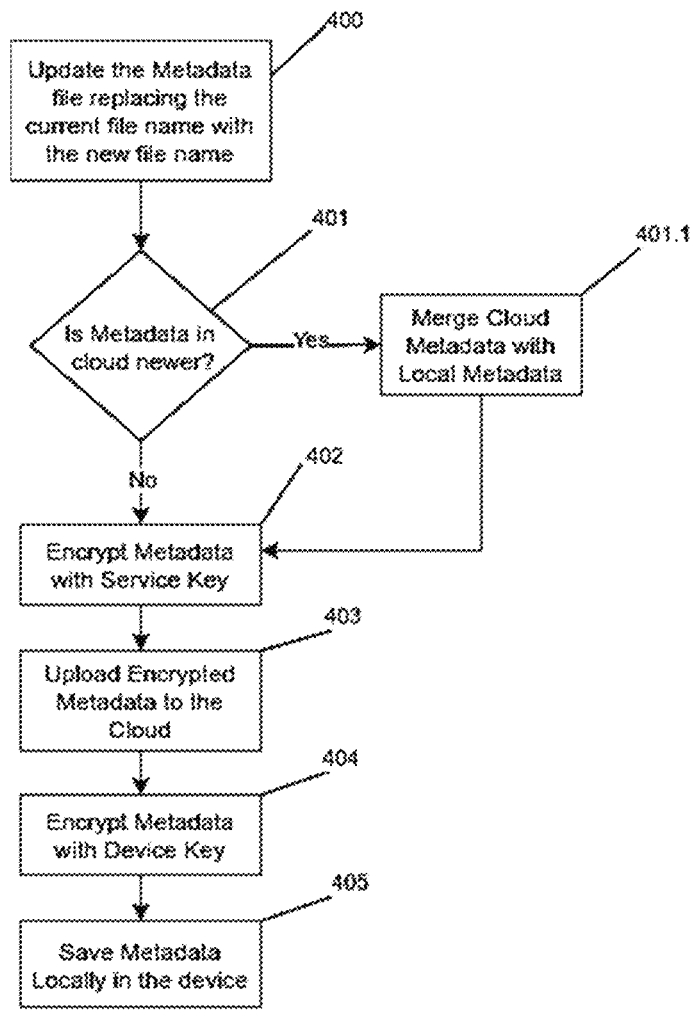
FIG. 5 shows a flow diagram of the steps of an exemplificative operation over a cloud service according to the present invention.

As explained before, four out of six operations over the cloud service (delete file/folder, move file/folder, rename file/folder, and create folder) can be done with minimum data traffic through the network. In FIG. 5, it is possible to notice the steps to an operation for renaming a file.

consideration that the user wants to ensure these files are secure, they are encrypted, and their names are secured in order to avoid a malicious person to guess part of the file content through cryptanalysis techniques. With that been said, if the user wants to rename one single file, the system needs to list all files (one cloud request), the files need to be downloaded (ten cloud requests and 20 MB of data usage), and decrypted. Then, the target file is renamed, encrypted again, and upload back to the cloud service (one cloud request and 2 MB of data usage). However, using the proposed SFMM method in this same scenario, the system needs to download only one metadata file (one cloud request and ~2 KB of data usage), decrypt it, find the target name inside it, rename the target name, encrypt the updated metadata file, and upload it back to the cloud (one cloud request and ~2 KB of data usage). As shown in Table 1, we can note that SFMM technique is much faster in terms of number of requests compared to traditional techniques which need twelve operation requests against only two requests of SFMM approach. Moreover, total data usage of SFMM technique is much lower (around 4 KB) compared to traditional techniques that could use up to 22 MB for performing the same file operation. If the user has a huge number of files, the SFMM, i.e., the metadata file size, will increase and, consequently, the download/upload of the metadata file could be slower, however the number of transactions will remain the same during the file operation. Considering each file entry can occupy 300 to 500 bytes in the metadata file, 1000 files would make a metadata file size less than 1 MB file size. In addition, a single user image file can easily occupy 3 MB. Therefore, the number of user files does not affect SFMM performance.

TABLE 1

Performance comparison

| | # Files | File Size (MB) | Operation | Download (MB) | Upload (MB) | # Requests | Total Data Transfer (MB) |
|---|---|---|---|---|---|---|---|
| SFMM | 10 | 2 | Rename | 0.002 | 0.002 | 2 | 0.004 |
| Other techniques | 10 | 2 | Rename | 20 | 2 | 12 | 22 |

The main advantage of the proposed method is that it is not necessary to perform any operation directly in the file stored in the cloud, it is just necessary to update the metadata file 400. The local metadata file is merged 401.1 with the metadata file in the cloud service if the cloud metadata file is more recent than the local metadata file 401. Hence, the local metadata file is encrypted with service key 402 and uploaded to the cloud service 403. After, the uploaded metadata file is encrypted with device key 404 and saved locally again 405.

Most of the techniques of prior art, when compared to the proposed method, create different metadata files and query over them for the files targeted by the user or other systems. Alternatively, similar methods create a complex apparatus (for instance, P2P network) for managing these files. Not to mention that the metadata files are usually stored only in the cloud service. The proposed approach of using one single file containing all necessary metadata is faster and reduce considerably the data traffic exchanged between the device and the cloud service.

As stated before, assuming the user has 10 photos in the cloud service and each photo is around 2 MB. Taking into Furthermore, the example embodiments described herein may be implemented using hardware, software or any combination thereof and may be implemented in one or more computer systems or other processing systems. Additionally, one or more of the steps described in the example embodiments herein may be implemented, at least in part, by machines. Examples of machines that may be useful for performing the operations of the example embodiments herein include general purpose digital computers, especially programmed computers, desktop computers, server computers, client computers, portable computers, mobile communication devices, tablets, and/or similar devices.

For instance, one illustrative example system for performing the operations of the embodiments herein may include one or more components, such as one or more microprocessors, for performing the arithmetic and/or logical operations required for program execution, and storage media, such as one or more disk drives or memory cards (e.g., flash memory) for program and data storage, and a random access memory, for temporary data and program instruction storage.

Therefore, the present invention is also related to a system for managing filesystem elements on a cloud service, characterized by comprising a processor, and a memory comprising computer readable instructions that, when performed by the processor, causes the processor to perform the method steps previously described in this disclosure.

The system may also include software resident on a storage media (e.g., a disk drive or memory card), which, when executed, directs the microprocessor(s) in performing transmission and reception functions. The software may run on an operating system stored on the storage media, such as, for example, UNIX or Windows, Linux, Android and the like, and can adhere to various protocols such as the Ethernet, ATM, TCP/IP protocols and/or other connection or connectionless protocols.

As is well known in the art, microprocessors can run different operating systems, and can contain different types of software, each type being devoted to a different function, such as handling and managing data/information from a particular source or transforming data/information from one format into another format. The embodiments described herein are not to be construed as being limited for use with any particular type of server computer, and that any other suitable type of device for facilitating the exchange and storage of information may be employed instead.

Software embodiments of the illustrative example embodiments presented herein may be provided as a computer program product, or software, which may include an article of manufacture on a machine-accessible or non-transitory computer-readable medium (also referred to as "machine-readable medium") having instructions. The instructions on the machine accessible or machine readable medium may be used to program a computer system or other electronic device. The machine-readable medium may include, but is not limited to, floppy diskettes, optical disks, CD-ROMs, and magneto-optical disks or other type of media/machine-readable medium suitable for storing or transmitting electronic instructions.

Therefore, it will be understood that each block of the flowcharts, the illustrations, and combinations of blocks in the flowchart illustrations, can be implemented by computer readable instructions. These instructions may be provided to a processor to produce a machine, such that the instructions, when executed on the processor, create means for implementing the actions specified in the flowchart block or blocks. The computer readable instructions, when executed by a processor, cause a series of operational steps to be performed by the processor to produce a computer-implemented process such that the instructions, which execute on the processor to provide steps for implementing the actions specified according to the present invention. The computer program instructions may also cause at least some of the operational steps shown in the blocks of the flowcharts to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Therefore, the present invention also relates to a non-transitory computer readable storage medium for managing filesystem elements on a cloud service, comprising computer readable instructions that, when performed by the processor, causes the processor to perform the method steps previously described in this disclosure.

The techniques described herein are not limited to any particular software configuration. They may be applicable in any computing or processing environment. The terms "machine-accessible medium", "machine-readable medium" and "computer-readable medium" used herein shall include any non-transitory medium that is capable of storing, encoding, or transmitting a sequence of instructions for execution by the machine (e.g., a CPU or other type of processing device) and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

Therefore, as seen above the present invention proposes a method and system that the user is able to take control of the encryption while storing files in cloud services. This is because according to the proposed approach the file name is secured with the hash of the encrypted file that is generated using a strong cryptographic hash function as most of cloud storage solutions keep the file name in plain text then allowing an attacker to apply cryptanalysis techniques to discover part of file content.

Moreover, the present invention provides a solution capable of reducing device storage usage while managing user files in a cloud service. In addition, according to the present invention, the traffic of data between the device and the cloud service is minimized. Thus, the present invention is advantageous in cases wherein the user's device does not have enough bandwidth to transmit and receive data when dealing with many files or large files in the cloud service, for example, the network connection is slow because of poor wireless network coverage.

While various example embodiments have been described above, it should be understood that they have been presented by way of example, and not limitation. It will be apparent to persons skilled in the relevant art(s) that various changes in form and detail can be made therein.

What is claimed is:

1. A method of managing filesystem elements between a user device and a network, the method comprising:
    receiving, on the network from the user device connected to the network, a request related to a filesystem element operation over the network, the user device comprising a local metadata file and a network encryption key, and the network comprising an encrypted network metadata file;
    performing, with the network, the filesystem element operation;
    updating, with the network, the local metadata file based on the filesystem element operation;
    downloading, with the user device, the encrypted network metadata file from the network to the user device, wherein the encrypted network metadata file comprises data of a filesystem on the network;
    decrypting, with the user device, the encrypted network metadata file on the user device with the network encryption key;
    provided network metadata stored in the network is newer than the updated local metadata file, merging, with the user device, the network metadata file stored in the network with the updated local metadata file to update the local metadata file with data from the network metadata file;

encrypting, with the user device, the updated local metadata file on the user device with the network encryption key; and uploading, with the user device, the encrypted updated metadata file to the network.

2. The method according to claim 1, wherein a filesystem element among the filesystem elements is a file or a folder.

3. The method according to claim 2, wherein the performing of the filesystem element operation comprises at least one of uploading a file, downloading a file, deleting a file or folder, moving a file or folder, renaming a file or folder, and creating a folder.

4. The method according to claim 3, wherein the performing of the filesystem element operation is uploading a file, and the method further comprises:

generating a hash value using a hashing function; and
replacing a file name with the hash value.

5. The method according to claim 4, wherein the hashing function is a SHA-256 hash function.

6. The method according to claim 2, wherein the performing of the filesystem element operation is uploading a file, and the method further comprises reading the file entirely;

generating a new random key for encrypting the file;
replacing a file name with a hash value using a hashing function; and
saving an original file name and the hash value in the network metadata file.

7. The method according to claim 1, wherein the user device stores the network encryption key, a base key, and a device key.

8. The method according to claim 7, wherein the base key is a random key used to encrypt the network encryption key.

9. The method according to claim 7, wherein the device key is created using a Key Derivation Function (KDF) based on the base key and a device unique identifier (UID).

10. The method according to claim 7, wherein the metadata file is copied and encrypted with the device key on the user device.

11. The method according to claim 10, wherein a user key is a password, passphrase or a biometric key representing a key from a user.

12. The method according to claim 11, wherein the user key is a face biometrics or a fingerprint biometrics.

13. The method according to claim 1, wherein the network encryption key is encrypted with a base key; and the network encryption key is uploaded to the network for enabling synchronization of other user devices.

14. The method according to claim 1, wherein the user device is a smartphone and connected to at least one cloud service via the network.

15. The method according to claim 14, wherein the user device comprises an application having a cloud common component for providing common interface to the at least one cloud service.

16. The method according to claim 14, wherein the user device comprises an application which comprises a biometric component comprising a face recognition component for reading biometric data from a user and a key extractor component for generating a user key.

17. A system, comprising:

the user device with network-based access to a cloud service;
a processor, and a memory comprising computer readable instructions that, when performed by the processor, causes the processor to perform the method as defined in claim 1.

18. A non-transitory computer readable storage medium having stored therein computer readable instructions that, when executed by a processor, causes the processor to perform the method as defined in claim 1.

19. A method of setting up user access to a storage system, the method comprising:

requesting, via an application on a user device, account credentials of a user;
checking whether the user has an account associated with a cloud service;
creating a new account for the user when no account exists for the user according to the checking;
downloading a base key, previously stored and encrypted, and a helper vector from a secure database on the internet when the account for the user exists according to the checking;
scanning a face of the user with a camera of the user device;
provided a help vector is available, reproducing a biometric user key with the helper vector and decrypting the base key;
provided the help vector is unavailable, generating a biometric key, creating a base key, encrypting the base key, uploading the encrypted base key and the helper vector to the cloud service;
creating a device key associated with the user device;
signing in the cloud service;
creating a service key;
encrypting the service key; and
uploading the encrypted service key to the cloud service.

* * * * *